United States Patent
Wei et al.

(10) Patent No.: US 8,188,693 B2
(45) Date of Patent: May 29, 2012

(54) DC BUS BOOST METHOD AND SYSTEM FOR REGENERATIVE BRAKE

(75) Inventors: Lixiang Wei, Whitefish Bay, WI (US); Richard A. Lukaszewski, New Berlin, WI (US); Russel Kerkman, Milwaukee, WI (US); Brian J. Seibel, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 382 days.

(21) Appl. No.: 12/612,336

(22) Filed: Nov. 4, 2009

(65) Prior Publication Data

US 2011/0101897 A1    May 5, 2011

(51) Int. Cl.
*H02P 27/00* (2006.01)
(52) U.S. Cl. ............ 318/400.03; 318/376; 318/801
(58) Field of Classification Search ............ 318/400.03, 318/376, 801, 803, 809, 400.3; 322/99
See application file for complete search history.

(56) References Cited

U.S. PATENT DOCUMENTS

| 4,475,150 A | 10/1984 | D'Atre et al. | |
|---|---|---|---|
| 6,034,512 A * | 3/2000 | Pierret | 322/99 |

FOREIGN PATENT DOCUMENTS

| JP | 59 153478 A | 10/1984 |
|---|---|---|
| JP | 7 154986 A | 6/1995 |
| JP | 2003 169496 A | 6/2003 |

* cited by examiner

*Primary Examiner* — Karen Masih
(74) *Attorney, Agent, or Firm* — Fletcherr Yoder, P.C.; Alexander R. Kuszewski; John M. Miller

(57) ABSTRACT

Embodiments of the present invention provide novel techniques for using a switched converter to provide for three-phase alternating current (AC) rectification, regenerative braking, and direct current (DC) voltage boosting. In particular, one of the three legs of the switched converter is controlled with a set of pulse width modulation (PWM) control signals so that the input AC phase having the highest voltage is rectified and one of the switches in the two other legs is turned on to allow for added voltage. This switching activity allows for voltage from multiple AC line mains to be combined, resulting in an overall boost of the DC voltage of the rectifier. The DC voltage boost can then be applied to the common DC bus in order to ameliorate voltage sags, help with motor starts, and increase the ride-through capability of the motor.

20 Claims, 5 Drawing Sheets

DC BUS BOOST METHOD AND SYSTEM FOR REGENERATIVE BRAKE

BACKGROUND

The present invention relates generally to the field of electric motor drives such as those used to control electric motors and similar loads. More particularly, the present invention relates to systems and methods for using switched converters to rectify alternating current (AC) into direct current (DC), boost the overall voltage of a DC bus, and provide for regenerative braking capabilities while reducing the number of components in the system.

Power rectifier systems are used in a wide range of applications. For example, power converters that perform rectification are used with centrifuges, magnetic clutches, pumps and more generally, in electric motor drive controllers to rectify and condition incoming AC voltage and to supply DC voltage to the motor. Many electric motor controllers also include some type of motor braking ability, in which energy from the motor is re-converted while slowing the driven load. The energy resulting from the braking operation can either be fed into a resistor, which will convert the energy into heat, or fed back into the supply network. Electric motor controllers with regenerative braking ability can feed the energy back into the supply network. This regenerative braking ability is very useful in reducing energy usage and in decreasing operational costs. Electric motor drives may also provide for the ability to boost DC voltage during certain low-voltage conditions such as sagging line voltage, motor starting, and heavy motor loading. The added boost in DC voltage during these periods allows for maintaining normal operating conditions and also increases the life of the motor. However, one drawback of electric motor drives that provide for motor drive, regenerative braking, and DC voltage boosting is that they require many extra components, lose energy due to constant switching activity, and are costly.

BRIEF DESCRIPTION

Embodiments of the present invention provide novel techniques for using a fundamental front end (FFE) rectifier to provide for AC rectification, regenerative braking, and DC voltage boosting. The FFE rectifier is simple to operate, uses less expensive components, and is more energy efficient in its switching activity than other types of switched converters. In particular, the FFE rectifier can incorporate a low impedance reactor (typically 3% impedance) and exhibits less energy loss due to switching than comparable rectifiers such as active front end (AFE) rectifiers. Cost can be minimized by reducing the number of system components and by lowering the operational expenses where possible.

In one embodiment, a method for controlling an electric motor via a controller and a rectifier is provided. The rectifier includes a positive solid state switch and a negative solid state switch for each of three phases of voltage. The rectifier may convert the three input phases of alternating current voltage to direct current voltage which may then be applied to a direct current bus. The method includes the detection of the voltage of the direct current bus and the voltage of each phase of input voltage, the identification of the phase of input voltage having the highest absolute voltage, the cycling of the positive and negative solid state switches of an identified phase, and the placing of a solid state switch for the two other phases in a conducting stated based upon which other phase exhibits the greater voltage difference from the identified phase.

In a second embodiment, a system is provided which includes a controller controlling an electric motor and a rectifier. The rectifier includes a positive solid state switch and a negative solid state switch for each of three input phases of alternating current power. The rectifier is capable of converting three input phases of alternating current power to direct current power applied to a direct current bus. A detector is also included which is capable of detecting the voltage of the direct current bus and the voltage of each input phase. The controller can use the detector to detect the voltage of the direct current bus and the voltage of each phase of input power. The controller can then identify the input phase having the highest voltage and can cycle the positive and negative solid state switches of the rectifier at the identified phase. The controller can then place a solid state switch of the rectifier for the two other phases in a conducting state based upon which other phase exhibits the greater voltage difference from the identified phase.

In a third embodiment, a method is provided for controlling an electric motor via a controller and a rectifier. The rectifier includes a positive and a negative solid state switch for each of three phases of power. The rectifier converts three input phases of alternating current power to direct current power applied to a direct current bus. The method detects the voltage of the direct current bus, and the voltage of each input phase of input power. The method identifies the phase of input power having the highest voltage, and cycles the positive and negative solid state switches of an identified phase. The method places a solid state switch for the two other phases in a conducting state based upon which other phase exhibits the greater voltage difference from the identified phase. The method also determines a duty cycle for cycling the positive and negative solid state switches of the identified phase based on electric power requirements, and wherein the positive and negative solid state switches of the identified phase are cycled at the determined duty cycle.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
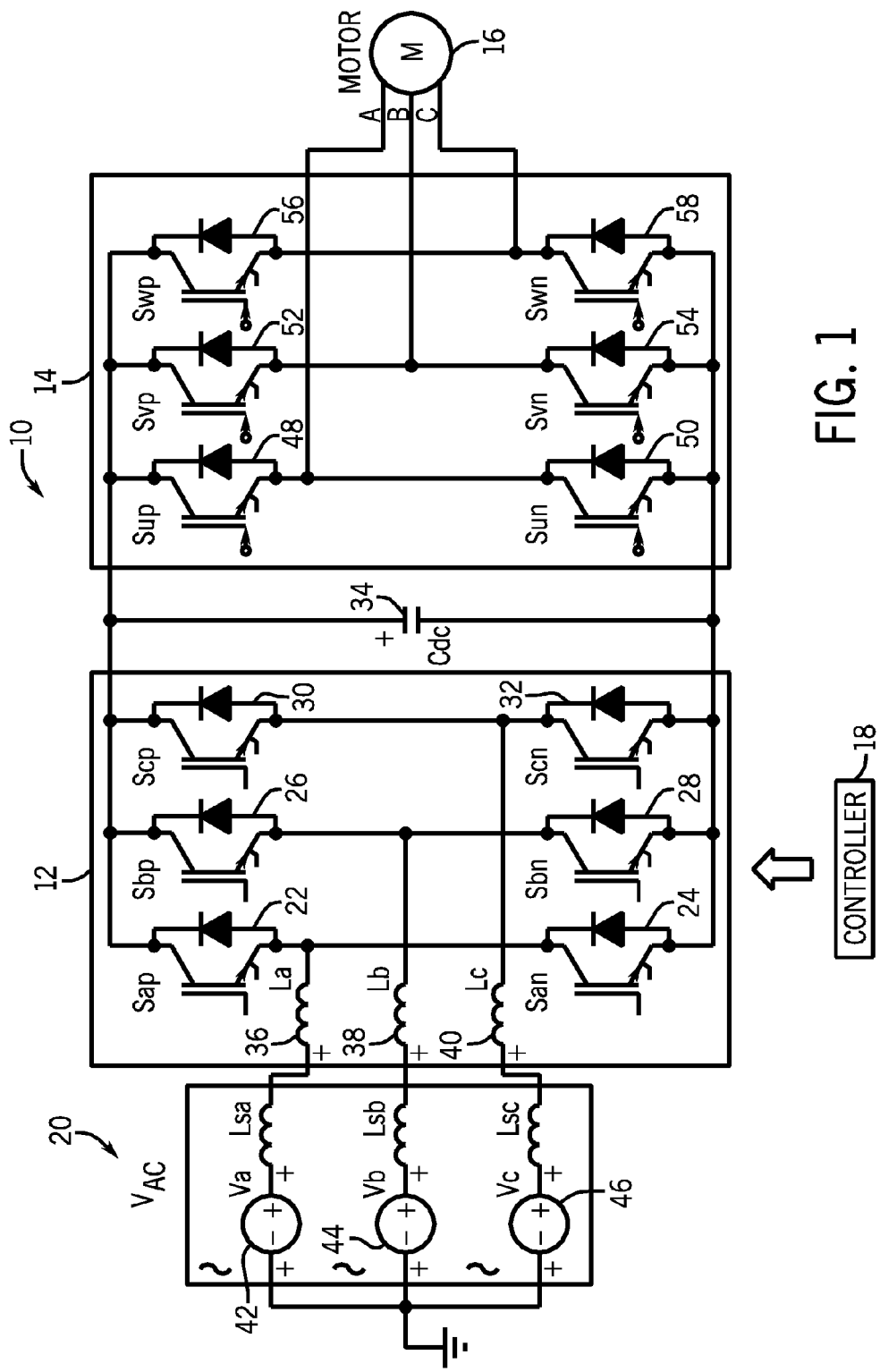
FIG. 1 is a schematic diagram of an exemplary embodiment of a rectifier being shown as a component in a larger circuit that is used to drive a three-phase motor.

FIG. 1 illustrates an embodiment of a three-phase motor controller 10. The three-phase motor controller 10 may include an insulated gate bipolar transistor (IGBT) rectifier circuit 12 coupled to an inverter circuit 14, which may be used to drive a three-phase motor 16. In the illustrated embodiment, the rectifier circuit and the inverter circuit are controlled by a controller 18. Three phases of AC voltage from the supply mains 20 are converted into DC voltage by the rectifier 12. The DC voltage is then converted to controlled frequency AC voltage by the inverter circuit 14 to drive the motor 16. In one embodiment of the invention the rectifier 12 may provide for AC rectification, braking regeneration, and DC voltage boosting. The rectifier circuit 12 comprises a set of solid state switches Sap 22, San 24, Sbp 26, Sbn 28, Scp 30, and Scn 32, each provided with a fly-back diode. In the present discussion, the subscripts "a", "b" and "c" are used to designate each of three phases of voltage, while the subscripts "p" and "n" are used to designate "positive" and "negative" sides of the DC bus output of the converter circuitry 12 (although such designations are by convention only). During rectification, the switches of the circuit need not be controlled (i.e., switched). This allows for the diode components of the IGBT switches Sap 22, San 24, Sbp 26, Sbn 28, Scp 30, and Scn 32 to act as a full wave rectifier that converts the incoming AC voltage 20 into DC voltage. The resulting DC voltage is transferred to a common DC bus and may then be converted into AC voltage by the inverter 14. A DC bus capacitor Cdc 34 is connected between the two DC bus lines and is used to create a low impedance source which also helps filter DC ripples. Line reactor components comprised of inductors La 36, Lb 38, and Lc 40 are used as a filter to smooth converted power signals and to improve the harmonics of the circuit.

In another phase of operation, the rectifier 12 allows for energy resulting from the braking of the three-phase motor 16 to be redirected back into the supply mains 20. As will be appreciated by those skilled in the art, during regenerative braking, the motor 16 behaves as a three-phase generator. Consequently, the switches of the rectifier 12 are switched by controller 18 in such a way as to allow the alternating current flowing through the main bus to pass back into the supply network. Each one of the positive switches Sap 22, Sbp 26, and Scp 30 is turned on when its respective phase voltage is the most positive of the three (upper half of the respective wave). Similarly, each of the negative switches San 24, Sbn 28, and Scn 32 is turned on when its respective phase voltage is the most negative of the three (lower half of the respective wave). This switching activity is then able to recapture the energy resulting from the braking activity.

Figure 2:
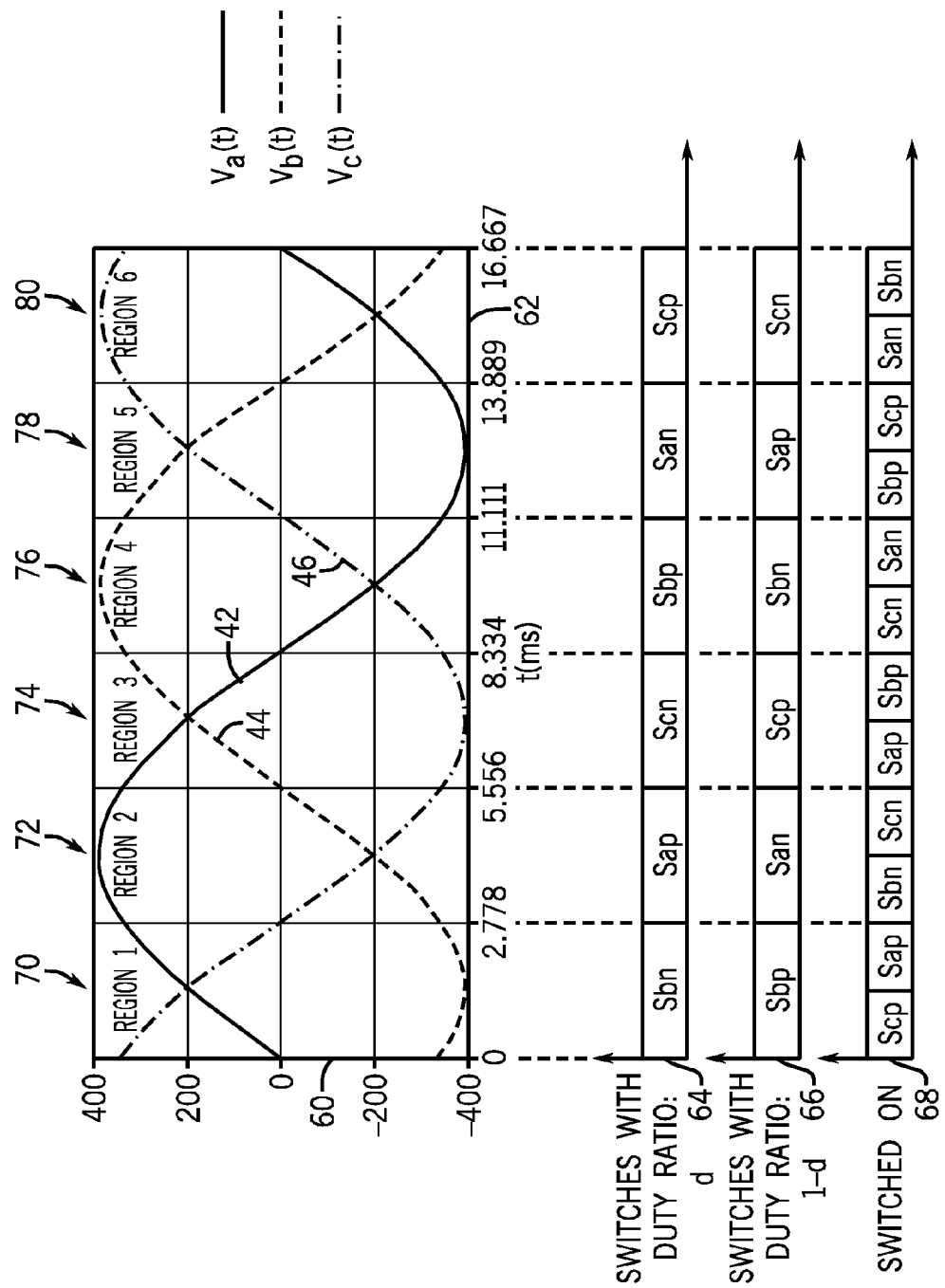
FIG. 2 is a three-phase voltage diagram alongside a switching diagram of a set of rectifier switches.

In yet another phase of operation, the rectifier boosts the DC voltage applied to the DC bus. FIG. 2 is helpful in detailing how the rectifier is able to provide for a boost in DC voltage. FIG. 2 is a phase diagram of the three input line phases Va 42, Vb 44, and Vc 46 showing the input phases going through a full phase cycle (i.e., 0°-360°). The input line voltages are plotted on the abscissa 60 against the elapsed time (msec) which is plotted on the ordinate 62. In an exemplary embodiment of the invention, switching schemes as represented by diagrams 64, 66, and 68 may be used to boost the available DC bus voltage produced by the rectifier 12. In particular, switching diagram 64 is a timing diagram that shows when the switches Sbn 28, Sap 22, Scn 32, Sbp 26, San 24, and Scp 30 should be controlled with a PWM switching pattern set at duty ratio d. Switching diagram 66 is a timing diagram that shows when the switches Sbp 26, San 24, Scp 30, Sbn 28, Sap 22, and Scn 32 should be controlled with a PWM switching patter set at a duty ratio 1-d. The switches found on switching diagram 68 are not controlled with PWM switching, but are rather controlled as shown in FIG. 2 (i.e., placed in a conducting or non-conducting state by application or removal of an appropriate gate drive signal from the controller). A method that results in the switch timing described in switching diagrams 64, 66 and 68 will result in both the rectification of AC voltage through all regions 1-6 (70-80) of the full phase cycle as well as the addition of voltage from two AC line mains which in turn will boost the DC voltage output of the rectifier 12. An FFE rectifier implementing such a timing of switches requires that only one leg (i.e., two switches) of the three AC legs be controlled by PWM switching. This saves switching energy as compared to active front ends circuits, which would require constant switching of all three legs (i.e., six switches). It is to be noted that the values of line voltage (along the abscissa 60) and the times (along the ordinate axis 62) illustrated in the figure are but one possible embodiment of the invention. Other alternate voltages values and timeline time measurements may be used.

Figure 3:
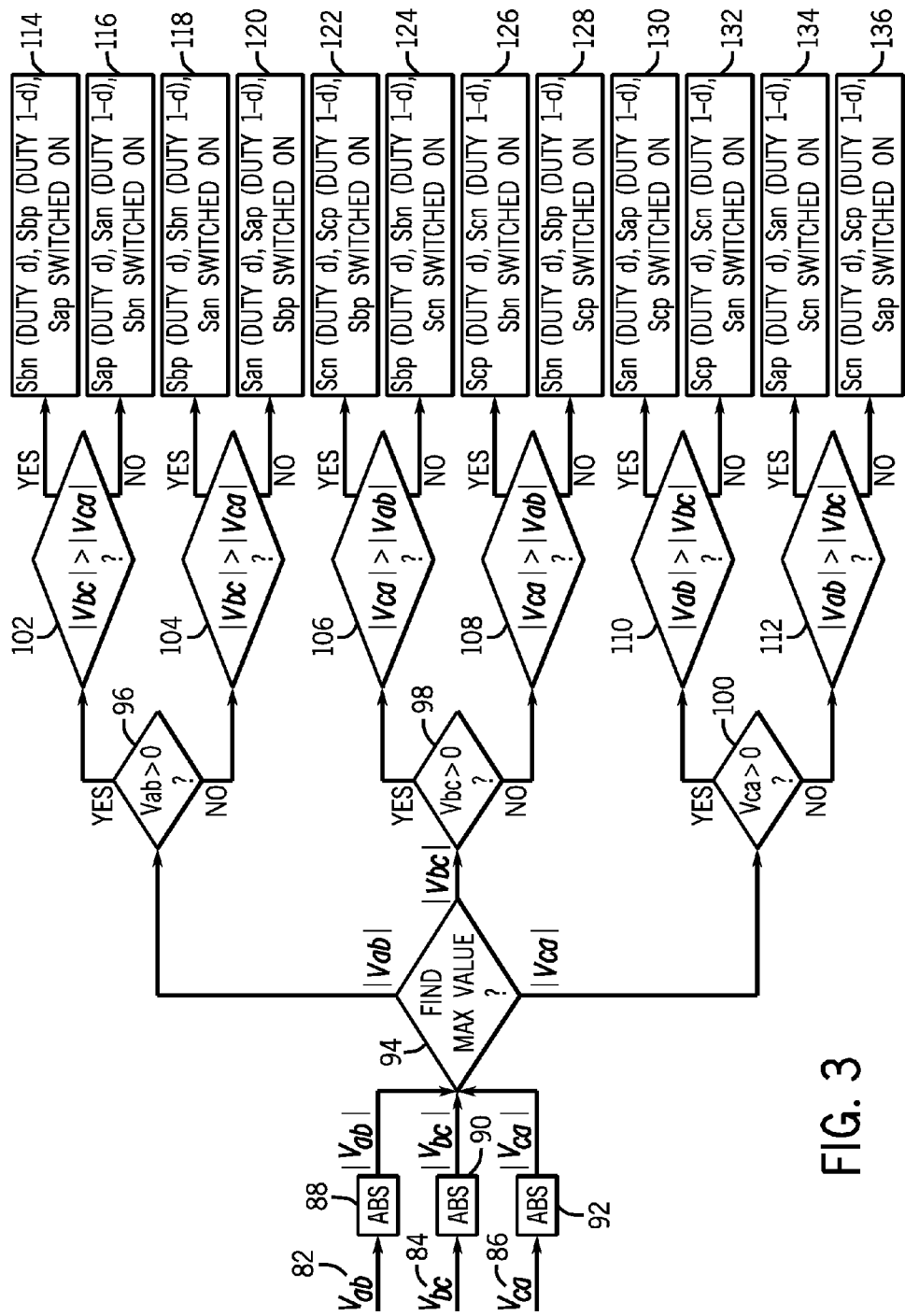
FIG. 3 is an exemplary flow chart of the methodology used to select a set of rectifier switches to which control signals are applied.

FIG. 3 is a flow diagram of an exemplary flow diagram for a process that may be used by the controller 18 to implement the switch timing described in switching diagrams 64, 66, and 68 of FIG. 2. The embodiment shown in FIG. 3 may allow for the controller 18 to combine voltage from the AC line mains Va, Vb, and Vc during the occurrence of the highest line-to-line voltage Vab 82, Vbc 84, or Vca 86 in each region 1-6 of the full phase cycle of FIG. 2. The resulting voltage combination may then be used to boost DC voltage. The controller 18 first finds the absolute values of the three line-to-line voltages Vab 82, Vbc 84, and Vca 86, as indicated by blocks 88, 90, and 92. The absolute values of the three line-to-line voltages are then compared at block 94, and the largest of the three values is chosen. As a first example, if Vab 82 is the largest value then the controller 18 determines whether Vab 82 is greater than zero, as indicated at block 96. If Vab 82 is a positive value, then the absolute values of line-to-line voltages Vbc 84 and Vca 86 are compared at block 102. If |Vbc| is found to be greater than |Vca|, then switch Sbn 28 is selected to be controlled with a PWM duty ratio of d, as indicated at block 114. The opposite leg switch Sbp 26 is also selected to be controlled with PWM duty ratio of 1-d in order to maintain full-wave DC rectification. Switch Sap 22 will also be turned on at the same block 114. All other switches of rectifier 12, San 24, Scp 30, and Scn 32 will be unswitched during this period of operation. This switching arrangement allows for the voltage combination of Va 42 with Vb 44 during the second half of region 1 of FIG. 2, which results in a boost in DC voltage over the standard operating DC voltage output of rectifier 12.

Returning to block 102, if |Vbc| is not found to be greater than |Vca|, then switch Sap 22 is selected to be controlled with a PWM duty ratio of d at block 116. The opposite leg switch San 24 is also selected to be controlled with PWM duty ratio of 1-d in order to maintain full-wave DC rectification. Switch Sbn 28 will also be turned on at the same block 116. All other rectifier switches, Sbp 26, Scp 30, and Scn 32 will be unswitched. This switching arrangement allows for the voltage combination of Va 42 with Vb 44 during the first half of region 2 of FIG. 2, which results in a boost in DC voltage over the standard operating DC voltage output of rectifier 12.

Continuing the example, if at block 96 the controller 18 determines that line-to-line voltage Vab 82 is not greater than zero, then the absolute values of line-to-line voltages Vbc 84 and Vca 86 are compared at block 104. If |Vbc| is found to be greater than |Vca|, then switch Sbp 26 is selected to be controlled with a PWM duty ratio of d at block 118. The opposite leg switch Sbn 28 is also selected to be controlled with PWM duty ratio of 1-d in order to maintain full-wave DC rectification. Switch San 24 will also be turned on at the same block 118. All other rectifier switches, Sbp 26, Scp 30, and Scn 32 will be unswitched. This switching arrangement allows for the voltage combination of Va 42 with Vb 44 during the second half of region 4 of FIG. 2, which results in a boost in DC voltage over the standard operating DC voltage output of rectifier 12.

Continuing with block 104, if |Vbc| is not found to be greater than |Vca|, then switch San 24 is selected to be controlled with a PWM duty ratio of d at block 120. The opposite leg switch Sap 22 is also selected to be controlled with PWM duty ratio of 1-d in order to maintain full-wave DC rectification. Switch Sbp 26 will also be turned on at the same block 120. All other rectifier switches, Sbn 28, Scp 30, and Scn 32 will be unswitched. This switching arrangement allows for the voltage combination of Va 42 with Vb 44 during the first half of region 5 of FIG. 2, which results in a boost in DC voltage over the standard operating DC voltage output of rectifier 12.

As a second example, if at block 94 the largest absolute value of the line-to-line voltages Vab 82, Vbc 84, and Vca 86 is determined to be Vbc 84, then the controller 18 determines whether Vbc 84 is greater than zero at block 98. If Vbc 84 is a positive value, then the absolute values of line-to-line voltages Vca 86 and Vab 82 are compared at block 106. If |Vca| is found to be greater than |Vab| then switch Scn 32 is selected to be controlled with a PWM duty ratio of d at block 122. The opposite leg switch Scp 30 is also selected to be controlled with PWM duty ratio of 1-d in order to maintain full-wave DC rectification. Switch Sbp 26 will also be turned on at the same block 122. All other rectifier switches, Sbn 28, Sap 22, and San 24 will be unswitched. This switching arrangement allows for the voltage combination of Vb 44 with Vc 46 during the second half of region 3 of FIG. 2, which results in a boost in DC voltage over the standard operating DC voltage output of rectifier 12.

Continuing with block 106, if |Vca| is not found to be greater than |Vab|, then switch Sbp 26 is selected to be controlled with a PWM duty ratio of d at block 124. The opposite leg switch Sbn 28 is also selected to be controlled with PWM duty ratio of 1-d in order to maintain full-wave DC rectification. Switch Scn 32 will also be turned on at the same block 124. All other rectifier switches Scp 30, Sap 22, and San 24 will be unswitched. This switching arrangement allows for the voltage combination of Vb 44 with Vc 46 during the first half of region 4 of FIG. 2, which results in a boost in DC voltage over the standard operating DC voltage output of rectifier 12.

If at block 98 the controller 18 determines that Vbc 84 is not greater than zero, then the absolute values of line-to-line voltages Vca 86 and Vab 82 are compared at block 108. If |Vca| is found to be greater than |Vab| then switch Scp 30 is selected to be controlled with a PWM duty ratio of d at block 126. The opposite leg switch Scn 32 is also selected to be controlled with PWM duty ratio of 1-d in order to maintain full-wave DC rectification. Switch Sbn 28 will also be turned on at the same block 126. All other rectifier switches, Sbp 26, Sap 22, and San 24 will be unswitched. This switching arrangement allows for the voltage combination of Vb 44 with Vc 46 during the second half of region 6 of FIG. 2, which results in a boost in DC voltage over the standard operating DC voltage output of rectifier 12.

Continuing with block 108, if |Vca| is not found to be greater than |Vab|, then switch Sbn 28 is selected to be controlled with a PWM duty ratio of d at block 128. The opposite leg switch Sbp 26 is also selected to be controlled with PWM duty ratio of 1-d in order to maintain full-wave DC rectification. Switch Scp 30 will also be turned on at the same block 128. All other rectifier switches, Scn 32, Sap 22, and San 24 will be unswitched. This switching arrangement allows for the voltage combination of Vb 44 with Vc 46 during the first half of region 1 of FIG. 2, which results in a boost in DC voltage over the standard operating DC voltage output of rectifier 12.

If at block 94 the largest absolute value of the line-to-line voltages Vab 82, Vbc 84, and Vca 86 is determined to be Vca 86, then the controller 18 determines whether Vca 86 is greater than zero at block 100. If Vca 86 is a positive value, then the absolute values of line-to-line voltages Vab 82 and Vbc 84 are compared at block 110. If |Vab| is found to be greater than |Vbc| then switch San 24 is selected to be controlled with a PWM duty ratio of d at block 130. The opposite leg switch Sap 22 is also selected to be controlled with PWM duty ratio of 1-d in order to maintain full-wave DC rectification. Switch Scp 30 will also be turned on at the same block 130. All other rectifier switches, Scn 32, Sbp 26, and Sbn 28 will be unswitched. This switching arrangement allows for the voltage combination of Va 42 with Vc 46 during the second half of region 5 of FIG. 2, which results in a boost in DC voltage over the standard operating DC voltage output of rectifier 12.

Continuing with block 110, if |Vab| is not found to be greater than |Vbc|, then switch Scp 30 is selected to be controlled with a PWM duty ratio of d at block 132. The opposite leg switch Scn 32 is also selected to be controlled with PWM duty ratio of 1-d in order to maintain full-wave DC rectification. Switch San 24 will also be turned on at the same block 132. All other rectifier switches, Sap 22, Sbp 26, and Sbn 28 will be unswitched. This switching arrangement allows for the voltage combination of Va 42 with Vc 46 during the first half of region 6 of FIG. 2, which results in a boost in DC voltage over the standard operating DC voltage output of rectifier 12.

If at block 100 the controller 18 determines that Vca 86 is not greater than zero, then the absolute values of line-to-line voltages Vab 82 and Vbc 84 are compared at block 112. If |Vab| is found to be greater than |Vbc|, then switch Sap 22 is selected to be controlled with a PWM duty ratio of d at block 134. The opposite leg switch San 24 is also selected to be controlled with PWM duty ratio of 1-d in order to maintain full-wave DC rectification. Switch Scn 32 will also be turned on at the same block 134. All other rectifier switches, Scp 30, Sbp 26, and Sbn 28 will be unswitched. This switching arrangement allows for the voltage combination of Va 42 with Vc 46 during the second half of region 2 of FIG. 2, which results in a boost in DC voltage over the standard operating DC voltage output of rectifier 12.

Continuing with block 112, if |Vab| is not found to be greater than |Vbc|, then switch Scn 32 is selected to be controlled with a PWM duty ratio of d at block 136. The opposite leg switch Scp 30 is also selected to be controlled with PWM duty ratio of 1-d in order to maintain full-wave DC rectification. Switch Sap 22 will also be turned on at the same block 136. All other rectifier switches, San 24, Sbp 26, and Sbn 28 will be unswitched. This switching arrangement allows for the voltage combination of Va 42 with Vc 46 during the first half of region 3 of FIG. 2, which results in a boost in DC voltage over the standard operating DC voltage output of rectifier 12.

It is to be noted that the methodology in FIG. 3 is but one possible embodiment of a methodology that may be used in the present invention to select appropriate switching of rectifier legs through all the regions of a full phase cycle. An alternate embodiment of a methodology could use the same switching diagrams 64, 66, and 68 found in FIG. 2 but would select when to PWM and when to turn on or off the switches based on the values of line-to-neutral voltages Va 42, Vb 44, and Vc 46. Yet another embodiment of a methodology could select when to PWM and when to turn on or off the switches based on a set of software timing flags in combination with line-to-line voltages Vab 82, Vbc 84, and Vca 86 or in combination with line-to-neutral voltages Va 42, Vb 44, and Vc 46. Any switching methodology that results in the switching activity depicted in switching diagrams 64, 66, and 68 of FIG. 2 may be used.

Figure 4A:
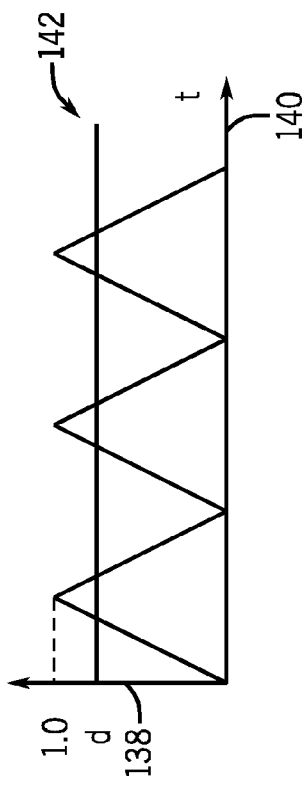
FIG. 4A illustrates a timing diagram of a set of duty cycles that may be used for pulse width modulation (PWM) of rectifier switches in accordance with an embodiment of the present invention.
Figure 4B:
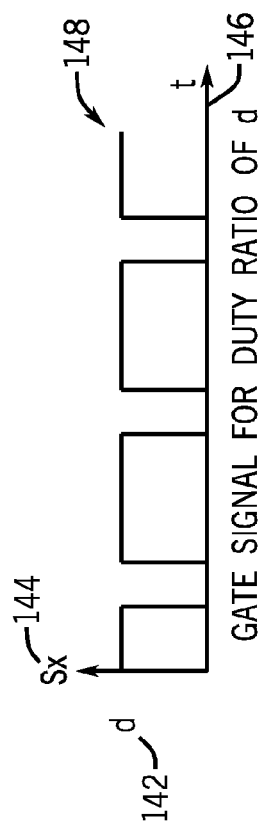
FIG. 4B illustrates a PWM control signal used to drive one of the rectifier switches.
Figure 4C:
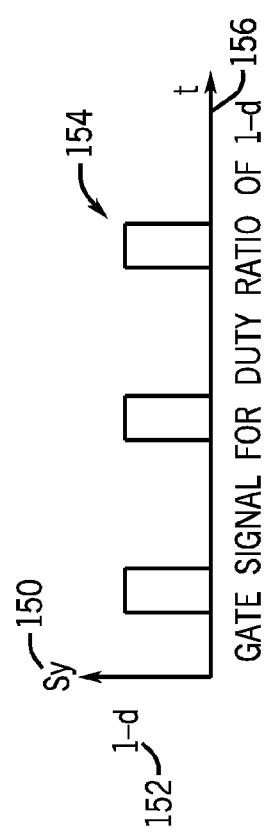
FIG. 4C illustrates a PWM control signal used to drive a different rectifier switch.

The duty ratios d and 1-d mentioned in previous embodiments of the current invention is explained in more detail in FIGS. 4A, 4B, and 4C. FIG. 4A depicts a timeline of time-varying duty ratios. The duty ratio d 142 of a switch is defined as the pulse duration divided by the pulse period. The ratio of the pulse duration over the pulse period may then be expressed as the percentage of time that the switch is in active operation (i.e., switched to a conducting state). For example, a switch that turns on for 10 ms out of 100 ms would have a duty ratio d=0.10 (10%). FIG. 4A depicts duty ratios from 0 to 1.0 (100%). An embodiment of the current invention calculates the duty ratio d 142 that will be used as described in previous sections to PWM a switch in one of the six legs of the rectifier 12. The switch found on the inverse leg of the switch being driven with duty ratio d 142 will be driven with duty ratio 1-d 152.

FIG. 4B shows typical control signal switching for a switch Sx 144 that is being controlled via PWM by controller 18 using a duty ratio of d 142. Switch Sx 144 could be any one of the switches Sap 22, San 24, Sbp 26, Sbn 28, Scp 30, Scn 32 that are found in the rectifier 12. The duty ratio of d 142 can be transformed to an equivalent PWM control signal at a certain modulating frequency with the aid of the equation Frequency=1/Period. The exemplary frequency range for motor control of the current invention is between 2 and 4 kHz. The duty ratio d 142 is converted into a PWM control signal 148 which is used to drive switch Sx 144.

FIG. 4C shows typical control signal switching for a switch Sy 150 that is being controlled via PWM by controller 18 using a duty ratio of 1-d 152. Switching of switch Sy 150 is the inverse leg of that for switch Sx 144 shown in FIG. 4B. For example, if switch Sx 144 corresponds to switch Sap 22, then switch Sy 150 will correspond to switch San 24, and vice versa. Switch Sy 150 could be any one of the switches Sap 22, San 24, Sbp 26, Sbn 28, Scp 30, Scn 32 that are found in the rectifier 12 as long as it is an opposite of switch Sx 144. Here again, the duty ratio of 1-d 152 can be transformed to an equivalent PWM control signal at a certain modulating frequency, by the equation Frequency=1/Period. The frequency used for duty ratio d 142 and duty ratio 1-d 152 is the same and is typically between 2 and 4 kHz. The duty ratio 1-d 152 is converted into a PWM control signal 154 which is used to drive switch Sy 150. In one embodiment of the invention, the PWM control signals 148 of FIG. 4B are used to control all the switches in FIG. 3 having a duty cycle of d. The complementary PWM control signals 154 of FIG. 4C are then used to control all the switches FIG. 3 having a duty cycle of 1-d.

Figure 5:
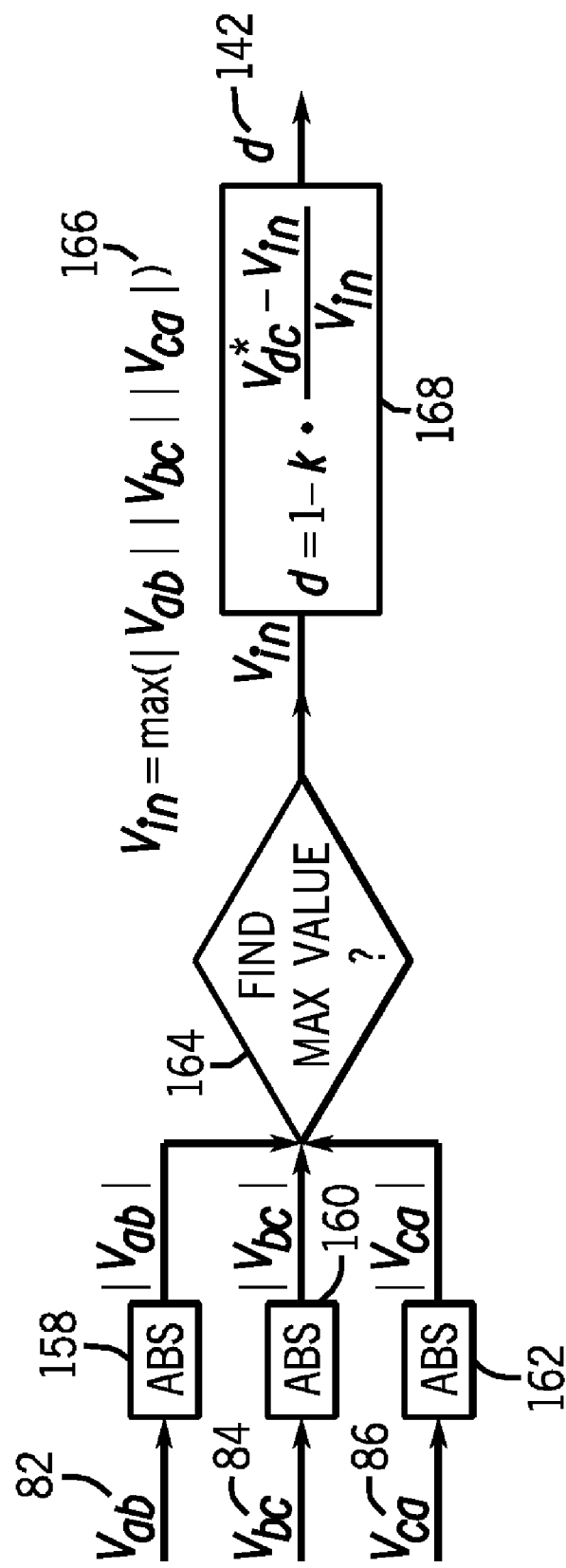
FIG. 5 is an exemplary flow chart that may be used to calculate the duty cycle d for pulse width modulation of switches of a rectifier.

The duty cycle d 142 determines the magnitude of the DC voltage boost that may be achieved. FIG. 5 is a flow diagram in an exemplary embodiment of the invention which may be used by the controller 18 to calculate the duty cycle d 142 which then may be used to create the PWM control signals 148. The controller 18 first finds the absolute values of the three line-to-line voltages Vab 82, Vbc 84, and Vca 86 at blocks 158, 160, and 162. The absolute values of the three line-to-line voltages are then compared at block 164 and the largest of the three values is assigned to the variable Vin 166. The equation for d $$d = 1 - k \cdot \frac{V_{dc}^* - V_{in}}{V_{in}}$$

is solved at block 168. The variable V*dc is set to be nominally below the standard non-boosted DC bus voltage. Typically, when the input line-to-line voltage is 480Vac, the V*dc voltage is set to 600 volts and may be increased to up to 629 volts for applications requiring an operational DC bus voltage of 630 volts. The constant k is in the range 0<k<1. The constant k may be set depending on the desired system stability under various conditions and is typically set to an exemplary value of 0.9.

In another embodiment of the invention, controller 18 may automatically boost the DC voltage of the DC bus by employing embodiments of the current invention. Controller 18 can detect low voltage conditions such as when the DC Bus voltage falls below a percentage range, for example, below 5% of a rated or steady state voltage. Controller 18 may then boost the DC bus voltage to a desired level. Similarly, controller 18 may detect when one or more of the three phases of AC input voltage falls below a certain voltage, for example, during brownout conditions. Controller 18 may then boost the DC bus voltage thus allowing the electric motor to continue to operate normally. Controller 18 can also detect when the DC voltage and/or the AC input voltage has returned to a normal operating range, for example within 5% of operating voltage, and automatically turn off the boosting of DC voltage. In yet another embodiment of the invention, controller 18 may automatically solve for d 142. The controller 18 may solve for d continuously during electric motor operation and then use d in conjunction with embodiments of the current invention to boost the DC bus voltage to a desired level.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling an electric motor via a controller and a rectifier comprising a positive solid state switch and a negative solid state switch for each of three phases of input voltage, the rectifier converting three input phases of alternating current voltage to direct current voltage applied to a direct current bus, the method comprising:
    (a) detecting the voltage of the direct current bus, and the voltage of each phase of input voltage;
    (b) identifying the phase of input voltage having the highest absolute voltage, and cycling the positive and negative solid state switches of an identified phase; and
    (c) placing a solid state switch for the two other phases in a conducting state based upon which other phase exhibits the greater voltage difference from the identified phase.

2. The method of claim 1, comprising repeating steps (b) and (c) over a plurality of cycles of the input voltage.

3. The method of claim 1, wherein steps (b) and (c) are carried out if the direct current bus voltage is below a threshold.

4. The method of claim 3, wherein steps (b) and (c) are continued until the direct current bus voltage rises above a second threshold.

5. The method of claim 1, wherein steps (b) and (c) are carried out if any of the three input phases of alternating current voltage is below a threshold.

6. The method of claim 5, wherein steps (b) and (c) are continued until the three input phases of alternating current voltage rise above a second threshold.

7. The method of claim 1, wherein each phase of input voltage is directed through a respective line reactor, and wherein placing the one solid state switch in a conducting state places the reactor for the respective other phase in series between the respective phase of input voltage and the solid state switches of the identified phase.

8. The method of claim 1, comprising determining a duty cycle for cycling the positive and negative solid state switches of the identified phase, and wherein the positive and negative solid state switches of the identified phase are cycled at the determined duty cycle.

9. The method of claim 1, comprising determining motor braking activity and cycling the positive and negative solid state switches during motor braking activity so that voltage generated by the motor braking activity is directed to the source of the three input phases of alternating current voltage.

10. A system, comprising:
a controller configured to control an electric motor;
a rectifier comprising a positive solid state switch and a negative solid state switch for each of three input phases of alternating current power, the rectifier configured to convert three input phases of alternating current power to direct current power applied to a direct current bus; and,
a detector configured to detect the voltage of the direct current bus, and the voltage of each input phase;
wherein the controller is configured to perform the steps of:
(a) using the detector to detect the voltage of the direct current bus, and the voltage of each phase of input power;
(b) identifying the input phase having the highest voltage, and cycling the positive and negative solid state switches of the rectifier at the identified phase; and
(c) placing a solid state switch of the rectifier for the two other phases in a conducting state based upon which other phase exhibits the greater voltage difference from the identified phase.

11. The system of claim 10, wherein the controller is configured to repeat the steps (a), (b), (c) over a plurality of cycles of the input power.

12. The system of claim 10, wherein the controller is configured to carry out steps (b) and (c) if the detector detects direct current bus voltage below a threshold, wherein steps (b) and (c) are continued until the direct current bus voltage rises above a second threshold.

13. The system of claim 10, wherein the controller is configured to carry out steps (b) and (c) if the detector detects any of the three input phases of alternating current voltage below a threshold, wherein steps (b) and (c) are continued until all of the three input phases of alternating current voltage rise above a second threshold.

14. The system of claim 10, wherein the controller is configured to detect motor braking activity and to switch the rectifier switches so that power from the motor braking activity is directed to the alternating current power source.

15. The system of claim 10, comprising first, second and third line reactors, each line reactor comprising 3% or less impedance, wherein each phase of input power is directed through the respective line reactor, and wherein placing the one solid state switch in a conducting state places the reactor for the respective other phase in series between the respective phase of input power and the solid state switches of the identified phase.

16. The system of claim 10, wherein the controller is configured to determine a duty cycle for cycling the positive and negative solid state switches of the identified phase, and wherein the positive and negative solid state switches of the identified phase are cycled at the determined duty cycle.

17. A method for controlling an electric motor via a controller and a rectifier comprising a positive and a negative solid state switch for each of three phases of power, the rectifier converting three input phases of alternating current power to direct current power applied to a direct current bus, the method comprising:
(a) detecting the voltage of the direct current bus, and the voltage of each input phase of input power;
(b) identifying the phase of input power having the highest voltage, and cycling the positive and negative solid state switches of an identified phase; and
(c) placing a solid state switch for the two other phases in a conducting state based upon which other phase exhibits the greater voltage difference from the identified phase;
(d) determining a duty cycle for cycling the positive and negative solid state switches of the identified phase based on electric power requirements, and wherein the positive and negative solid state switches of the identified phase are cycled at the determined duty cycle.

18. The method of claim 17, comprising repeating steps (b), (c), and (d) over a plurality of cycles of the input power.

19. The method of claim 17, wherein steps (b), (c), and (d) are carried out if the direct current bus voltage or any of the three input phases of alternating current voltage is below a threshold.

20. The method of claim 17, comprising converting direct current power from the direct current bus to controlled alternating current power at a desired frequency, and applying the controlled alternating current power to a load.

* * * * *